United States Patent
Könen et al.

(10) Patent No.: US 12,224,653 B2
(45) Date of Patent: Feb. 11, 2025

(54) ELECTRIC MOTOR VEHICLE TRACTION MOTOR WITH STATOR HAVING SLOT MOLDING AND LIQUID COOLED END WINDING

(71) Applicant: Dr. Ing. h.c. F. Porsche Aktiengesellschaft, Stuttgart (DE)

(72) Inventors: Christian Könen, Stuttgart (DE); Stefan Oechslen, Stuttgart (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 285 days.

(21) Appl. No.: 17/702,970

(22) Filed: Mar. 24, 2022

(65) Prior Publication Data
US 2022/0337126 A1    Oct. 20, 2022

(30) Foreign Application Priority Data
Apr. 19, 2021  (DE) .................. 10 2021 109 730.4

(51) Int. Cl.
*H02K 15/10*  (2006.01)
*H02K 1/20*  (2006.01)
(Continued)

(52) U.S. Cl.
CPC .............. *H02K 9/197* (2013.01); *H02K 1/20* (2013.01); *H02K 3/24* (2013.01); *H02K 5/203* (2021.01); *H02K 15/10* (2013.01)

(58) Field of Classification Search
CPC ............ H02K 9/197; H02K 1/20; H02K 3/24; H02K 5/203; H02K 9/19; H02K 15/024;
(Continued)

(56) References Cited

U.S. PATENT DOCUMENTS 10,135,319 B2   11/2018  Hanumalagutti et al.
10,673,306 B2    6/2020  Handa et al.
(Continued)

FOREIGN PATENT DOCUMENTS

CN          107204684 A     9/2017
DE       102006029803 A1    1/2008
(Continued)

OTHER PUBLICATIONS

Korean Notice of Preliminary Rejection for Korean Application No. 10-2022-0045511, dated Oct. 27, 2023 with translation, 11 pages.

*Primary Examiner* — Christopher M Koehler
*Assistant Examiner* — Viswanathan Subramanian
(74) *Attorney, Agent, or Firm* — Buchanan Ingersoll & Rooney PC

(57) ABSTRACT

An electric motor vehicle traction motor has a motor housing, a liquid-cooled motor stator and a dry running internal motor rotor which is separated fluidically from the motor stator. The motor stator is formed by a stator body with radial stator slots and a plurality of stator coils. The axial phase windings are arranged in the stator slots, and the winding heads of protrude axially out of the stator slots. A slot potted body is made from a potting material and by way of which the stator coil axial phase windings are potted into the stator slots in a fluid-tight manner. The stator coil winding heads are of potting-free configuration and protrude in each case directly into a fluid-tight cooling space. As a result of the omission of a separate split cage, a small air gap is realized and manufacturing costs are reduced.

3 Claims, 3 Drawing Sheets

Figure 1:
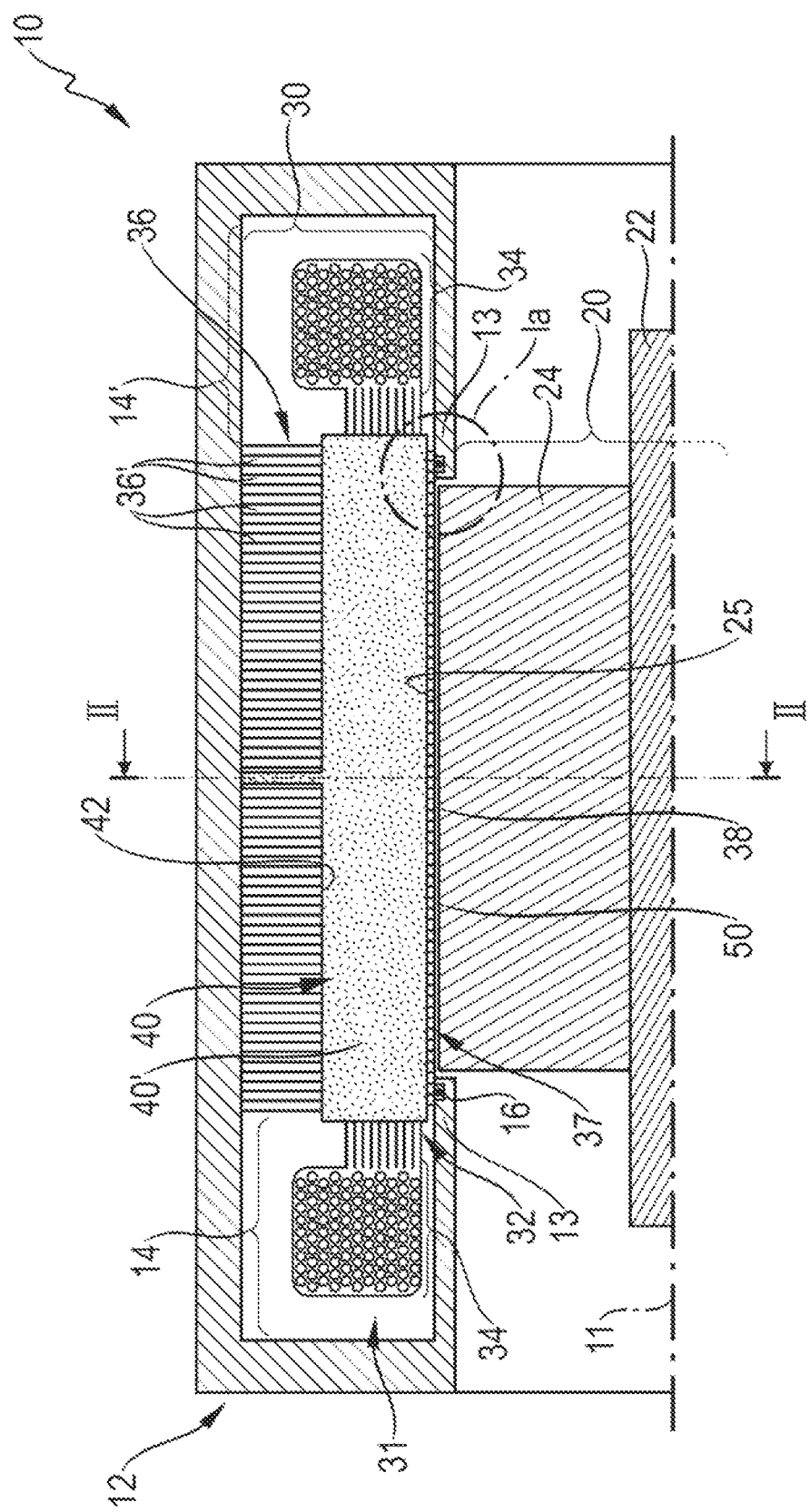

(51) Int. Cl.
   *H02K 3/24*     (2006.01)
   *H02K 5/20*     (2006.01)
   *H02K 9/197*    (2006.01)

(58) Field of Classification Search
   CPC ...... H02K 3/345; H02K 3/487; H02K 15/085;
         H02K 15/105; H02K 15/12; Y02T 10/64;
              B60Y 2200/91; B29C 33/76; B29C
                                        45/2628
   See application file for complete search history.

(56)              References Cited

U.S. PATENT DOCUMENTS

| | | | |
|---|---|---|---|
| 10,784,738 | B2 | 9/2020 | Berendes et al. |
| 10,971,975 | B2 | 4/2021 | Ronning |
| 2013/0270931 | A1* | 10/2013 | Handa ............... H02K 5/10 |
| | | | 310/43 |
| 2018/0166951 | A1* | 6/2018 | Ronning ............. H02K 3/18 |
| 2020/0156296 | A1 | 5/2020 | Silva et al. |

FOREIGN PATENT DOCUMENTS

| | | |
|---|---|---|
| DE | 102017102141 A1 | 8/2018 |
| DE | 102018219819 A1 | 5/2020 |
| KR | 20130112922 A | 10/2013 |
| KR | 20190087463 A | 7/2019 |

\* cited by examiner

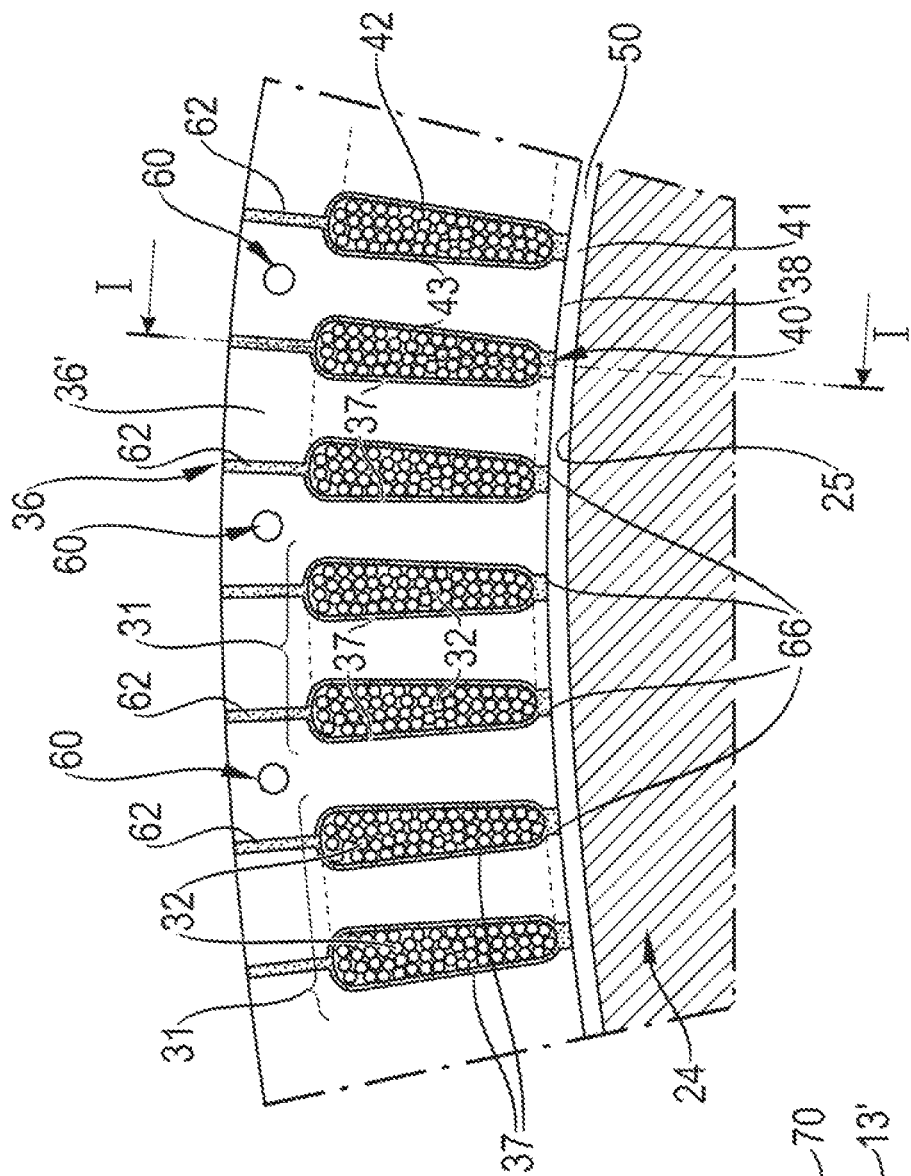
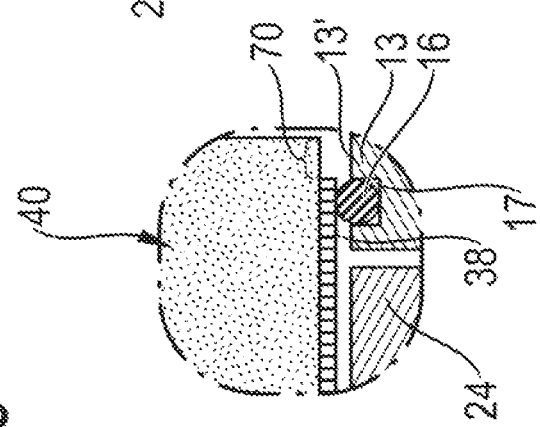
Fig. 1a
Fig. 2

ELECTRIC MOTOR VEHICLE TRACTION MOTOR WITH STATOR HAVING SLOT MOLDING AND LIQUID COOLED END WINDING

CROSS REFERENCE TO RELATED APPLICATION

This application claims priority to German Patent Application No. 10 2021 109 730.4, filed Apr. 19, 2021, the content of such application being incorporated by reference herein in its entirety.

FIELD OF THE INVENTION

The invention relates to an electric motor vehicle traction motor with a liquid-cooled motor stator and a dry running motor rotor.

BACKGROUND OF THE INVENTION

An electric motor vehicle traction motor provides drive power outputs in the kilowatt range from double digit to low four digit, with the result that high power losses occur in the form of heat, in particular in the motor stator, in which the stator coils are arranged, which power losses have to be dissipated by way of liquid cooling. It is particularly effective for the heat to be dissipated directly from the stator coils into a cooling liquid. In order that the internal motor rotor remains dry, it is separated fluidically from the motor stator.

What is known as a split cage is frequently installed for separating the motor stator fluidically from the motor rotor, as is known, for example, from DE 10 2017 102 141 A1, which is incorporated herein by reference. However, what is known as the air gap between the motor stator and the motor rotor is enlarged by way of a split cage, as a result of which the electromagnetic effectiveness is decreased.

As an alternative, the entire motor stator or all the stator coils can be potted in an electrically non-conducting potting body, as is known, for example, from DE 10 2018 219 819 A1, which is incorporated herein by reference. As a result, however, the heat flow between the stator coils and the cooling liquid is impaired considerably.

SUMMARY OF THE INVENTION

Described herein is an electric motor vehicle traction motor with a high degree of efficiency and effective stator cooling, and a method for producing a motor vehicle traction motor of this type.

The electric motor vehicle traction motor according to aspects of the invention provides a drive power output in the double digit to four digit kilowatt range. The electric motor vehicle traction motor has a liquid-cooled motor stator and a dry running internal motor rotor, with the result that the motor stator surrounds the motor rotor in a ring-like manner. The motor rotor is separated fluidically and shielded from the motor stator. The motor stator has a stator body with radial stator slots and a plurality of stator coils, the axial phase windings of which are respectively arranged in the stator slots, and the winding heads of which protrude axially out of the stator slots. The stator body is preferably formed by a multiplicity of packetized stator laminations.

A slot potted body is provided consisting of an electrically non-conducting, liquid-resistant and liquid-tight potting material, by way of which the stator coil axial phase windings are potted into the stator slots in a fluid-tight manner. In contrast, the stator coil winding heads are of substantially potting-free configuration and protrude in each case axially directly into a cooling space which is filled with a cooling liquid and is formed by the motor housing. The stator coil winding heads are therefore cooled directly by way of the cooling liquid during operation, whereas the stator coil axial phase windings are not cooled directly by way of the cooling liquid. The cooling liquid can be water or an oil.

The slot potted body establishes the fluidic insulation between the motor rotor dry space and the liquid-conducting cooling space. A separate split cage for the fluidic separation of the liquid-cooled motor stator from the dry running motor rotor is not required, and can therefore be completely omitted. As a result, the circular-cylindrical air gap between the motor stator and the motor rotor can be kept as small as possible, with the result that a high electromagnetic effectiveness or a high electromagnetic degree of efficiency is realized. Furthermore, the slot potted body stabilizes and fixes the stator coil axial phase windings or their individual coil wires to one another mechanically, with the result that the risk of chafing of the insulation or damage of the coil wires by way of the electromagnetic forces which act on the coil wires is also reliably avoided as a result.

The motor stator and the motor rotor are arranged in a motor housing which also defines the cooling spaces, in which the stator coil winding heads are arranged. The slot potted body consists of a suitable electrically isolating and liquid-resistant potting material, for example of an epoxy resin, possibly filled with suitable fillers for improving the thermal conductivity.

Although the axial phase windings of the stator coils cannot be cooled directly by way of the cooling liquid on account of the slot potted body which encloses the stator coil axial phase windings in a fluid-tight manner, the greatest part of the heat which is generated in the stator coils accrues in the winding heads which are liquid-cooled directly. Furthermore, the coil wires as a rule consist of a material, for example of copper, which has excellent thermal conducting properties, with the result that the heat can flow from the axial phase windings to a sufficient extent axially into the winding heads, where the heat is output over a large area by the coil wires directly into the cooling liquid.

No costs for a dimensionally precise and mechanically highly stable split cage are incurred, with the result that the production costs of the traction motor are decreased considerably as a result.

The stator slots formed by the stator body are preferably open radially inward toward the motor rotor, with the result that no material bridges are provided between the pole shoes which are formed by the stator body. These slit-like slot openings are closed fluidically by way of the slot potted body.

The slot potted body preferably does not protrude appreciably out of the stator slots radially inward from the stator body, with the result that the cylindrical inner circumferential face of the motor stator is formed substantially by the stator body itself. The cylindrical inner circumferential face of the motor stator delimits the circular-cylindrical air gap between the motor stator and the motor rotor. As a result, the radial width of the circular-cylindrical air gap between the motor rotor and the motor stator can be kept very small, which in turn makes a high degree of electromagnetic efficiency possible.

As an alternative, the inner circumferential face is formed exclusively by the slot potted body, with the result that the tooth heads are completely potted.

The slot potted body preferably protrudes axially with a certain overhang out of the stator slots and into the fluid-tight cooling space. As a result, all the parts of the slot potted body which are arranged within the stator slots are connected in one piece to one another, as a result of which the mechanical stability of the slot potted body overall is improved. Furthermore, the axial overhangs of the slot potted body improve the electrical insulation of the stator coils with respect to the stator body in order to avoid leakage currents.

The stator body preferably has a plurality of axial cooling ducts, through which the cooling liquid can flow from the one axial end of the motor stator to the other axial end of the motor stator. In this way, an axial cooling flow can be realized between the two end-side cooling spaces, with the result that the two end-side cooling spaces are connected fluidically to one another, for example in series.

The stator body preferably has a plurality of injection channels which in each case connect a stator slot to the radial outer side of the stator body. The injection channels are preferably arranged in the axial center of the stator body, and are particularly preferably filled with the potting material. The injection channels are of significance, in particular, for the production of the slot potted body.

An exemplary method for producing the electric motor vehicle traction motor has the following method steps:

First of all, an unfinished motor stator consisting of the stator body and the stator coils is produced. On its inner circumferential side, the stator body does not have any material bridges between the pole shoes, with the result that the stator slots are fluidically accessible from the radial inside.

A liquid potting material is injected into the stator slots radially from the inside and/or radially from the outside in order to form the slot potted body, with the result that the slot potted body is developed in this way in the direction of the axial ends. The injection can take place, for example, approximately axially centrally, with the result that the flowable potting material flows from the axial center in the stator slots to the axial ends of the stator slots. The potting process or the injection can be controlled in such a way that the liquid potting material arrives approximately at the same time at the two axial ends.

After the potting material has hardened, the potting molds are removed, and the motor rotor is inserted into the motor stator. Before or after the insertion, the motor stator and possibly the motor rotor which has already been installed are installed into the motor housing. In this way, a production method is provided by way of simple means, by way of which production method the fluidic insulation of the dry running motor rotor from the liquid-cooled motor stator can be realized in an inexpensive way.

A mold core with radial injection channels is preferably inserted into the unfinished motor stator before the injection of the potting material, to be precise into the cylindrical cavity which is provided for the motor rotor. The mold core has radial injection channels, through which the liquid potting material is injected radially directly into the stator slots. After the injection of the potting material into the stator slots, the mold core is removed again, with the result that the motor rotor can subsequently be inserted into the motor stator. A simple production method is produced in this way.

BRIEF DESCRIPTION OF THE DRAWING FIGURES

In the following text, one exemplary embodiment of the electric motor vehicle traction motor according to aspects of the invention and the production method for producing it will be described in greater detail on the basis of the drawings, in which:

FIG. 1 shows a diagrammatic longitudinal section of an electric motor vehicle traction motor according to aspects of the invention with a liquid-cooled motor stator and a dry running motor rotor, FIG. 1a shows an enlarged illustration of a detail Ia of the fluid-tight attachment of the motor stator and the motor housing, FIG. 2 shows a diagrammatic cross section II-II of the traction motor from FIG. 1, and FIGS. 3a to 3c show three method steps of a method for producing the motor vehicle traction motor of FIGS. 1, 1a and 2.

DETAILED DESCRIPTION OF THE INVENTION

FIGS. 1 and 2 diagrammatically show an electric motor vehicle traction motor 10 with a motor housing 12, a liquid-cooled motor stator 30 and a dry running internal motor rotor 20 which is separated fluidically from the motor stator 30. The motor rotor 20 is formed substantially by a rotor shaft 22 and a permanently magnetic rotor body 24 which is seated fixedly on the rotor shaft 22 for conjoint rotation. The rotor shaft 22 rotates about a motor axis 11 which is the central longitudinal axis of the traction motor 10. The motor stator 30 is formed substantially by a stator body 36 which is formed from a multiplicity of identical stator laminations 36' and by a multiplicity of stator coils 31.

Each stator core 31 is formed in each case by two axial phase windings 32 which are adjacent to one another and by winding heads 34 which connect the two axial phase windings 32 to one another in each case on the end side. The stator body 36 has a multiplicity of stator slots 37, in which the axial phase windings 32 of the stator coils 31 are arranged. Each axial phase winding 32 consists in each case of a plurality of coil wires which run approximately in the longitudinal direction with respect to one another and parallel to one another, and between which small intermediate spaces exist in each case. All of the coil wires in each case have an electrical insulation layer which is formed by an insulating varnish.

Each stator slot 37 is delimited substantially by slot walls 42, 43 which form a constant cross-sectional profile in the longitudinal direction, each stator slot 37 being open toward the motor rotor 20 radially on the inside in each case via a longitudinal slit-like slot opening 66. The slot openings 66 in each case separate the pole shoes of the stator body 36 from one another.

The motor stator 30 has a slot potted body 40 consisting of a potting material 40' which is an epoxy resin in the present case. The axial phase windings 32 or the coil wires which form them are potted in a fluid-tight manner in the slot potted body 40, with the result that the slot potted body 40 or the potting material 40' fills both the intermediate space between the respective axial phase winding 32 and the respective slot walls 42, 43 and the intermediate spaces between the coil wires among one another. The slot openings 66 are also filled in each case with the potting material 40' of the potted body 40 and are closed fluidically in this way.

The cylindrical inner circumferential face 38 of the stator body 36 on one side and the cylindrical outer circumferential face 25 of the rotor body 24 on the other side define a cylindrical ring-shaped air gap 50 between them, which air gap 50 separates the motor stator 30 and the motor rotor 20 from one another or by which air gap 50 the motor stator 30 and the motor rotor 20 are spaced apart from one another radially.

The stator body 36 has a plurality of axial cooling ducts 60, by way of which the two annular cooling spaces 14, 14' are connected fluidically to one another. Furthermore, the stator body 36 has a plurality of radial injection channels 62, each injection channel 62 in each case connecting a stator slot 37 to the radial outer side of the stator body 36. The injection channels 62 are arranged in the axial center of the stator body 36, and are filled completely with the potting material 40'.

The winding heads 34 of the stator coils 31 are of potting-free configuration, and in each case protrude axially into a fluid-tight annular cooling space 14, 14'. The slot potted body 40 protrudes axially with an axial overhang 70 in each case out of the stator slots 37 and into the respective cooling space 14, 14'. The axial overhang 70 is at least several millimeters.

The motor housing 12 has a substantially cylindrical inner cooling space wall 13, on the cylindrical outer circumferential face 13' of which an annular slit-like seal groove 17 is made, in which a sealing ring 16 is inserted, on which the inner circumferential face 38 of the motor stator 30 lies in a fluid-tight manner radially from the outside.

Figure 3C:
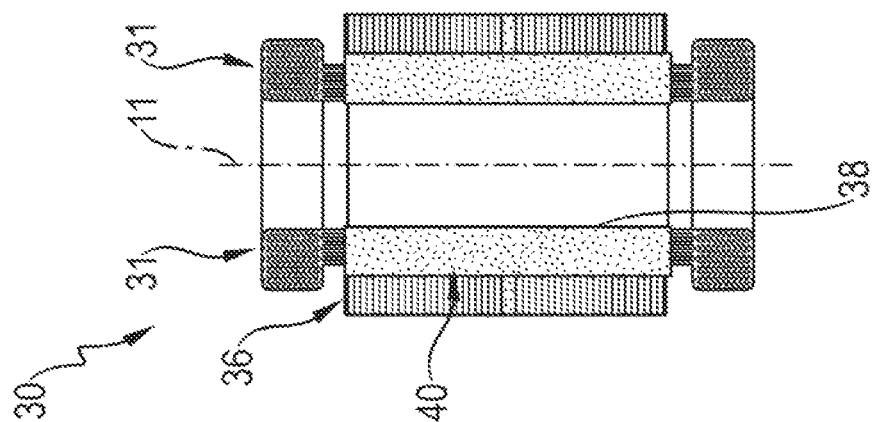
Figure 3B:
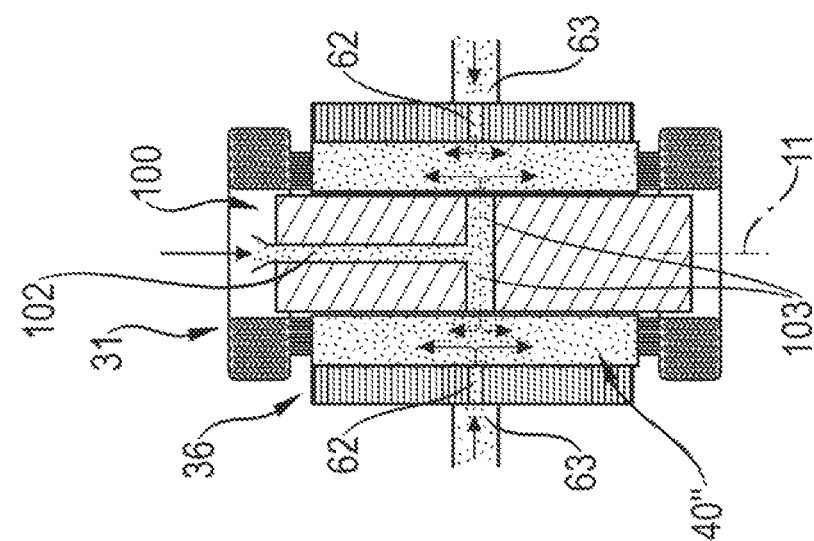
Figure 3A:
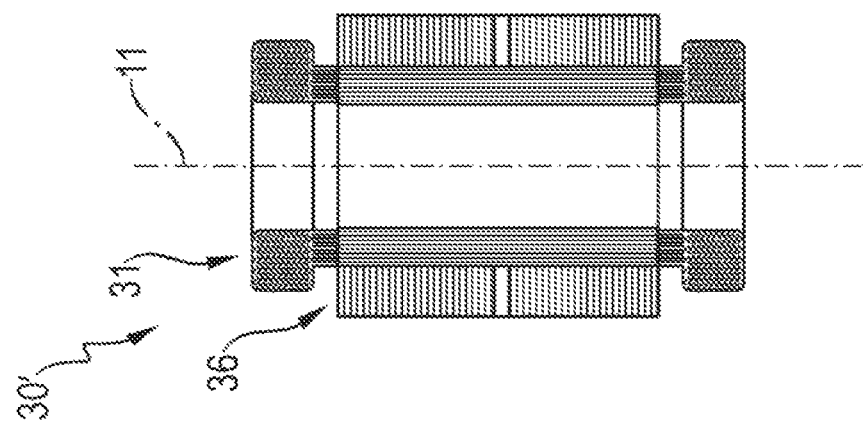

FIGS. 3a to 3c show three phases of a method for producing the electric motor vehicle traction motor 10. First of all, an unfinished motor stator 30' is produced which consists of the stator body 36 and the stator coils 31 which are inserted into it, as shown in FIG. 3a. Subsequently, a fully cylindrical mold core 100 with a central axial supply channel 102 and a plurality of injection channels 103 which emanate radially from it is inserted into the cylindrical cavity of the unfinished motor stator 30', as shown in FIG. 3b. Each injection channel 103 is aligned with a stator slot 37, with the result that the number of injection channels 103 corresponds to the number of stator slots 37. The external diameter of the cylindrical mold core 100 is merely slightly smaller than the internal diameter of the cylindrical inner circumferential wall 38 of the stator body 36.

Subsequently, the liquid potting material 40' is injected through the radial injection channels 103 radially from the inside and through mold injection channels 63 and the stator body injection channels 62 which are aligned radially with them radially from the outside into the axial center of the stator slots 37, with the result that the liquid potting material 40' propagates in the stator slots 37 from the axial center in the two axial directions in the direction of the two cooling spaces 14, 14'. In this way, all the cavities within the stator slots 37 are filled with a potted body 40'' consisting of the liquid potting material 40'. The potting process is stopped as soon as the potting material 40' has formed a sufficient overhang 70 in the two cooling spaces 14, 14'.

All the potting molds including the mold core 100 are finally removed, with the result that the motor stator 30 is finished after hardening of the slot potted body 40. The motor stator 30 is finally installed into the motor housing 12, and the motor rotor 20 is installed into the motor stator 30.

What is claimed:

1. A method for producing an electric vehicle traction motor, the traction motor including (i) a motor housing, (ii) a motor stator having a stator body with laminations and stator slots and a plurality of stator coils, wherein axial phase windings of the stator coils are arranged in the stator slots, and (iii) an internal motor rotor which is separated fluidically from the motor stator, said method comprising the steps of:

inserting a mold core having radially extending injection channels into a central opening of the motor stator;

following the inserting step, injecting liquid potting material into the stator slots radially from an inside of the stator slots via the radially extending injection channels of the mold core as well as radially from an outside of the stator slots in order to form a slot potted body, such that the injected liquid potting material passes through the stator slots and exits the stator slots to protrude axially out of the stator slots thereby defining an overhanging portion of the slot potted body that overhangs the stator slots and an end-most lamination of the laminations of the stator body, wherein a shoulder is formed at an intersection of the overhanging portion and said end-most lamination of the stator body, inserting a motor rotor into the central opening of the motor stator, and installing the motor rotor and the motor stator into a motor housing.

2. The method as claimed in claim 1, wherein at least one of the stator slots that is disposed in a first lamination of the laminations and between two adjacent lamination sections of the first lamination includes (i) a radially outward portion that is positioned furthest from the rotor and has a first gap dimension defined between the two adjacent lamination sections, (ii) a radially inward portion that is positioned closest to the rotor and has a second gap dimension defined between the two adjacent lamination sections, and (iii) a central portion disposed between the radially outward and inward portions, the central portion having a third gap dimension defined between the two adjacent lamination sections, wherein the third gap dimension is larger than the first and second gap dimensions, and wherein the axial phase windings of the stator coils are arranged in the central portion.

3. The method as claimed in claim 1, wherein the stator body has a plurality of injection channels which, in each case, connect one of the stator slots to an outer side of the stator body, wherein the injection channels of the stator body are filled with the potting material, and wherein, for each injection channel of the stator body, the injection channel has a smaller cross-sectional width than the stator slot to which that injection channel is connected.

\* \* \* \* \*